United States Patent
Riley

(10) Patent No.: US 6,224,167 B1
(45) Date of Patent: May 1, 2001

(54) RETAINING ASSEMBLY FOR AN AXLE HUB AND BEARING ASSEMBLY

(75) Inventor: Andrew John Riley, Wrexham (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/359,236

(22) Filed: Jul. 22, 1999

(51) Int. Cl.$^7$ .............................. B60B 35/00; F16B 39/10
(52) U.S. Cl. ............................................ 301/126; 411/120
(58) Field of Search .................................. 301/105.1, 126, 301/131, 35.63, 124.1; 411/116, 117, 120, 121, 122, 123, 124

(56) References Cited

U.S. PATENT DOCUMENTS

| | | | |
|---|---|---|---|
| 2,622,934 | * 12/1952 | Phelps | 301/105.1 |
| 2,698,202 | * 12/1954 | Weisel | 301/35.63 |
| 3,439,955 | * 4/1969 | Cadiou | 301/133 |
| 3,701,564 | * 10/1972 | Puzik | 301/131 |
| 4,812,094 | * 3/1989 | Grube | 411/134 |
| 5,533,849 | * 7/1996 | Burdick | 411/120 |
| 5,560,687 | * 10/1996 | Hagelthorn | 301/105.1 |
| 5,772,373 | * 6/1998 | Cronin, II et al. | 411/120 |
| 5,967,722 | * 10/1999 | Fett | 411/120 |

* cited by examiner

Primary Examiner—S. Joseph Morano
Assistant Examiner—Long Bao Nguyen
(74) Attorney, Agent, or Firm—Carslon, Gaskey & Olds

(57) ABSTRACT

An axle assembly for supporting wheels is provided that has a spindle defining an axis of rotation with a threaded end portion. A hub assembly is supported by the spindle and is adapted to support the wheels. A bearing assembly is arranged adjacent to the threaded end portion and is interposed between the spindle and the hub assembly for permitting low friction rotation of the hub assembly relative to the spindle about the axis. An end nut is secured to the threaded end portion of the spindle for retaining the bearing assembly and the hub assembly on the spindle. A washer is interposed between said bearing assembly and the end nut wherein the washer secures the end nut to the spindle for preventing rotation of the end nut about the axis.

16 Claims, 4 Drawing Sheets

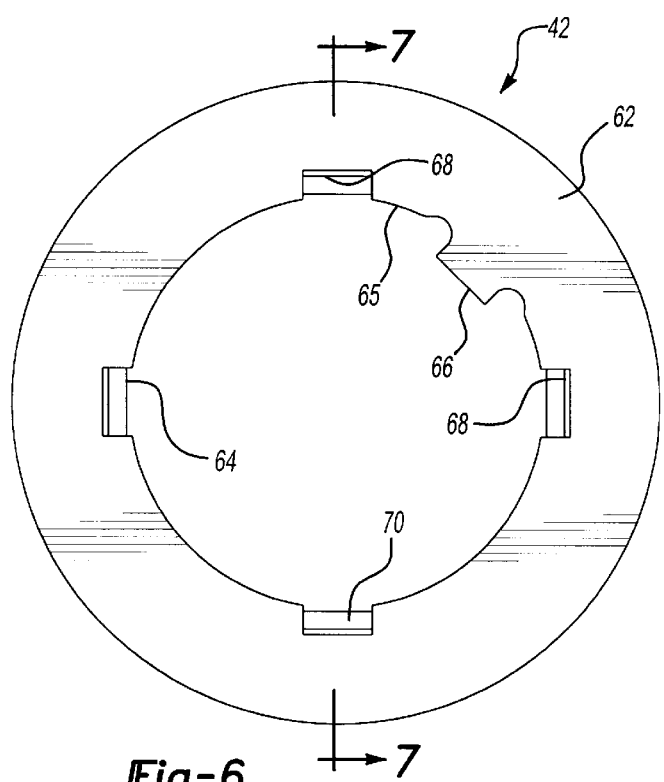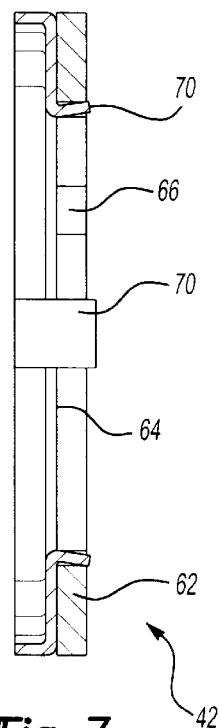
*Fig-6*  *Fig-7*
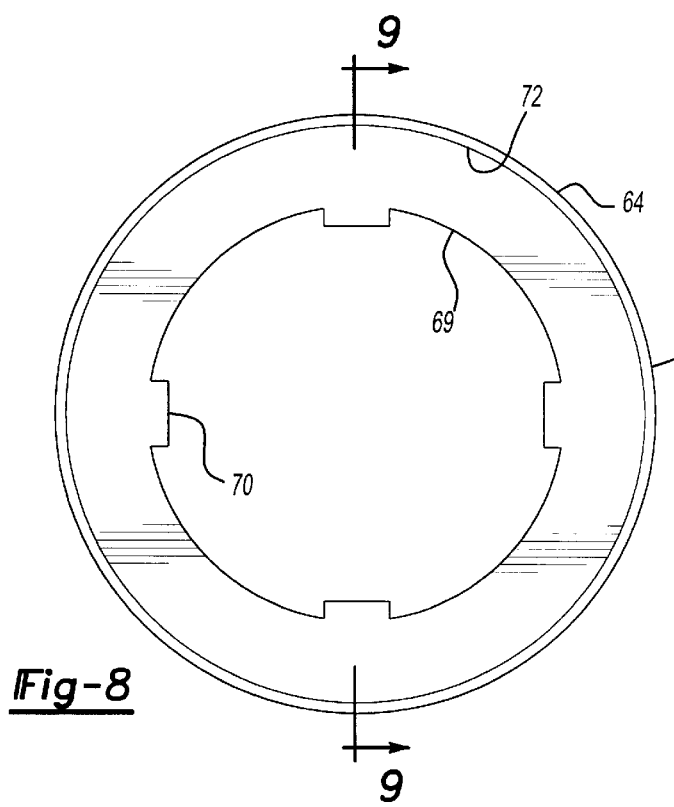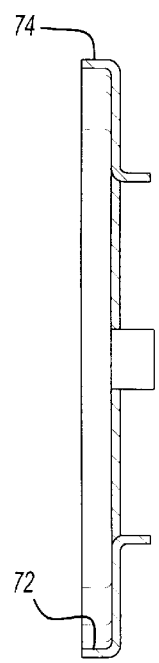
*Fig-8*  *Fig-9*

RETAINING ASSEMBLY FOR AN AXLE HUB AND BEARING ASSEMBLY

BACKGROUND OF THE INVENTION

This invention relates to an axle assembly for supporting wheels and, more specifically, to a retaining assembly used to retain a hub assembly and bearing assembly onto a spindle of the axle assembly.

Axle assemblies support wheels on their distal ends, or spindles. Hub assemblies, which carry the wheels, are supported on the spindles by bearing assemblies. Typically, end nuts are fastened to the spindles to secure the bearing and hub assemblies to the spindle. An additional retaining device is usually employed to ensure that the end nut does not come unfastened from the spindle. For example, a split pin may be installed in a hole transverse to the spindle axis and adjacent to the end nut. However, if the hole and pin are not precisely placed relative to the location of the installed end nut, the pin will be difficult to install or will allow the nut to loosen until it contacts the pin. Therefore, what is needed is a retaining device that prevents the end nut from loosening from its originally installed location.

SUMMARY OF THE INVENTION AND ADVANTAGES

The present invention provides an axle assembly for supporting wheels that has a spindle defining an axis of rotation with a threaded end portion. A hub assembly is supported by the spindle and is adapted to support the wheels. A bearing assembly is arranged adjacent to the threaded end portion and is interposed between the spindle and the hub assembly for permitting low friction rotation of the hub assembly relative to the spindle about the axis. An end nut is secured to the threaded end portion of the spindle for retaining the bearing assembly and the hub assembly on the spindle. A washer is interposed between said bearing assembly and the end nut wherein the washer secures the end nut to the spindle for preventing rotation of the end nut about the axis.

Accordingly, the above provides an improved mechanism for retaining the hub assembly and bearing assembly on the spindle of an axle assembly.

BRIEF DESCRIPTION OF THE DRAWINGS

Other advantages of the present invention can be understood by reference to the following detailed description when considered in connection with the accompanying drawings wherein:

FIG. 6 is a top elevational view of the washer assembly;

FIG. 7 is a cross-sectional view of the washer assembly taken along line 7—7 in FIG. 6;

FIG. 8 is a top elevational view of the staking washer of the washer assembly;

FIG. 9 is a cross-sectional view of the staking washer taken along line 9—9 in FIG. 8;

DETAILED DESCRIPTION OF THE PREFERRED EMBODIMENT

Figure 1:
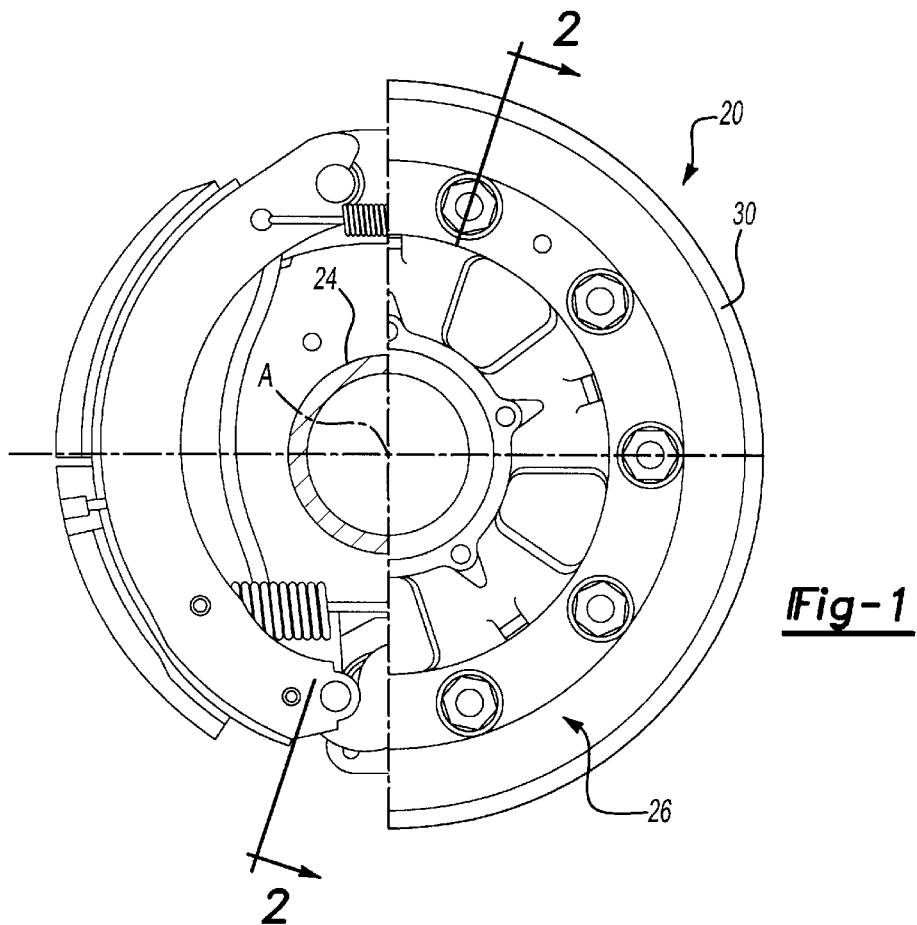
FIG. 1 is an end view of the axle assembly of the present invention partially broken away to show the drum brakes.
Figure 2:
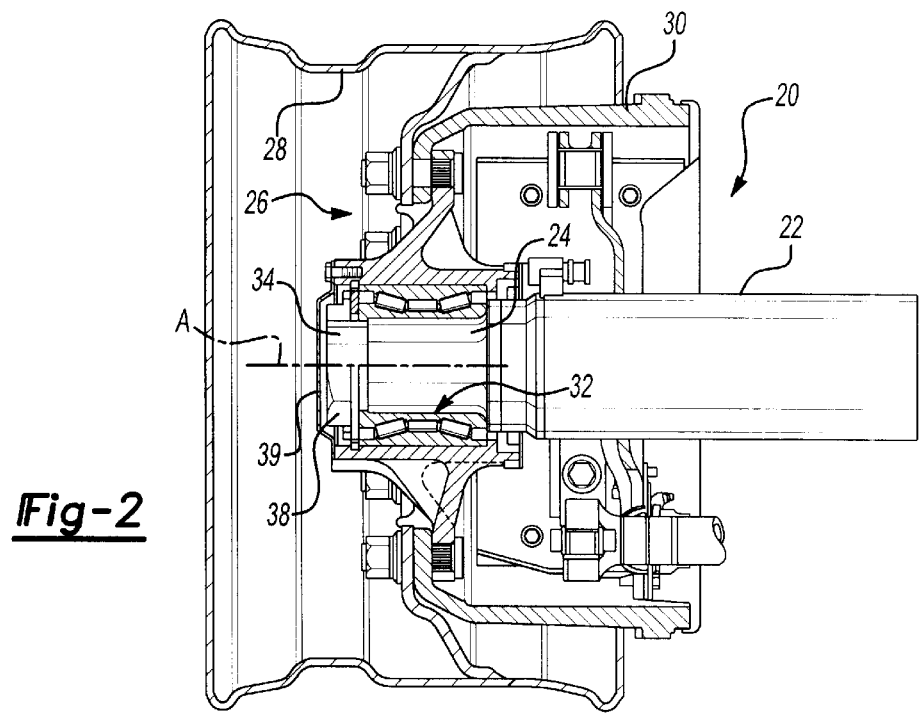
FIG. 2 is a cross-sectional view of the axle taken along line 2—2 in FIG. 1.

Referring to FIGS. 1 and 2, an axle assembly 20 has an axle housing 22 with a spindle 24 at each of its distal ends. The spindle 24 defines an axis of rotation, A, about which a hub assembly 26 rotates. The hub assembly 26 is supported by the spindle 24 and is adapted to support the wheels 28. The hub assembly 26 also supports a brake drum 30, or a rotor for disc brakes (not shown). A bearing assembly 32 is arranged between the spindle 24 and hub assembly 26 to permit low friction rotation of the hub assembly 26 about the axis A. The spindle 24 has a threaded end portion 34 adjacent to the bearing assembly 32 with an end nut 38 fastened to the threaded end portion 34 for retaining the bearing assembly 32 and hub assembly 26 on the spindle 24. A hub cap 39 is secured to the hub assembly 26 to seal the bearing assembly 32 from the outside environment.

Figure 3:
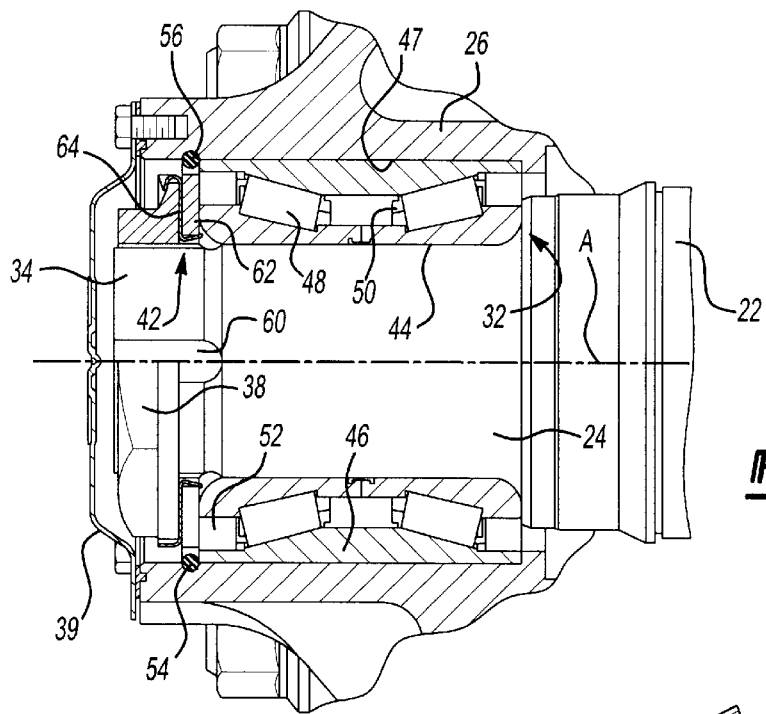
FIG. 3 is an enlarged view of the bearing area shown in FIG. 2.

Referring now to FIG. 3, a washer assembly 42 is arranged between the bearing assembly 32 and the end nut 38. The washer assembly 42 secures the end nut 38 to the spindle 24 for preventing rotation of the end nut 38 about the axis A, which is described in more detail below. The bearing assembly 32, or bearing cartridge, has a two piece cone 44 press fit onto the spindle 24 and a cup 46 press fit into an interior surface 47 of the hub assembly 26. Roller bearings 48 are arranged radially between the cone 44 and cup 46 and are located relative to one another by a cage 50. Seals 52 are arranged between the cone 44 and cup 46 at the outer ends of the bearing assembly 32 to prevent debris from penetrating the bearing assembly 32.

Figure 4:
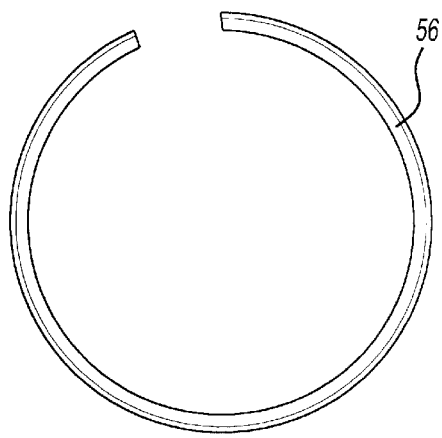
FIG. 4 is a top elevational view of the retaining clip.

The hub assembly 32 has a groove 54 on the interior surface 47 adjacent to the cup 46. A C-shaped retaining clip 56, best shown in FIG. 4, is seated in the groove 54 to retain the bearing assembly 32 in the hub assembly 26 and prevent movement of the bearing assembly 32 along the axis A. The retaining clip 56, which has a circular cross-section, is larger than the groove 54 so that the retaining clip 56 must be compressed to insert the clip 56 into the groove 54.

Figure 5:
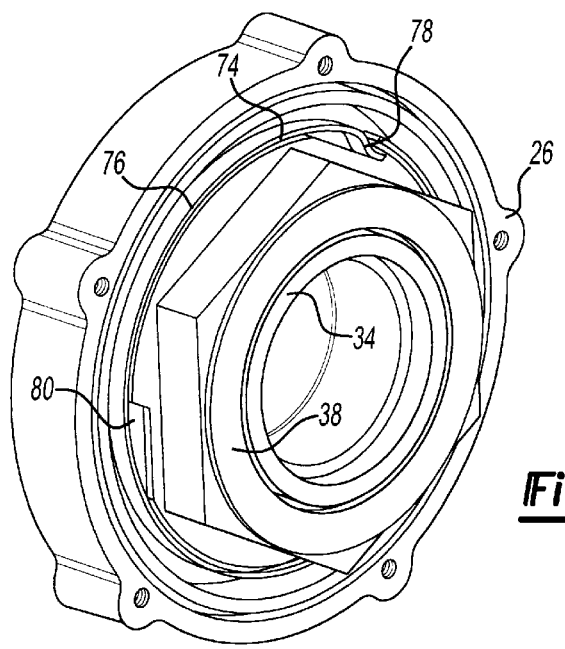
FIG. 5 is a perspective end view of the axle assembly of the present invention.

Referring now to FIG. 5 in conjunction with FIG. 3, the end nut 38 is prevented from loosening by rotating about the axis A. To this end, the washer assembly 42 is secured to the spindle 24 and the end nut 38. The washer assembly 42 includes a locating washer 62 and a staking washer 64 that are secured to one another. The locating washer 62 engages a groove 60 in the spindle 24 that is generally parallel with the axis A, and the staking washer 64 is deformed into engagement with the end nut 38.

Referring to FIGS. 6–9, the locating washer 62 has a first inner diameter 65 with a tab 66 that extends radially inwardly from the first inner diameter 65 and engages the groove 60 thereby preventing the washer assembly 42 from rotating about the spindle 24. The staking washer 64 includes a second inner diameter 69 with at least one prong 70 extending transversely from the second inner diameter 69. The locating washer 62 has at least one notch 68 that receives a corresponding prong 70 for securing the locating 62 and staking 64 washers together. The prongs 70 may be bent outward from the inner diameter 69 to ensure that the washers 62, 64 are secured together. The staking washer 64 has an outer diameter 72 with an arcuate flange 74 extending transversely from the outer diameter 72, best shown in FIGS. 8 and 9.

Figure 10:
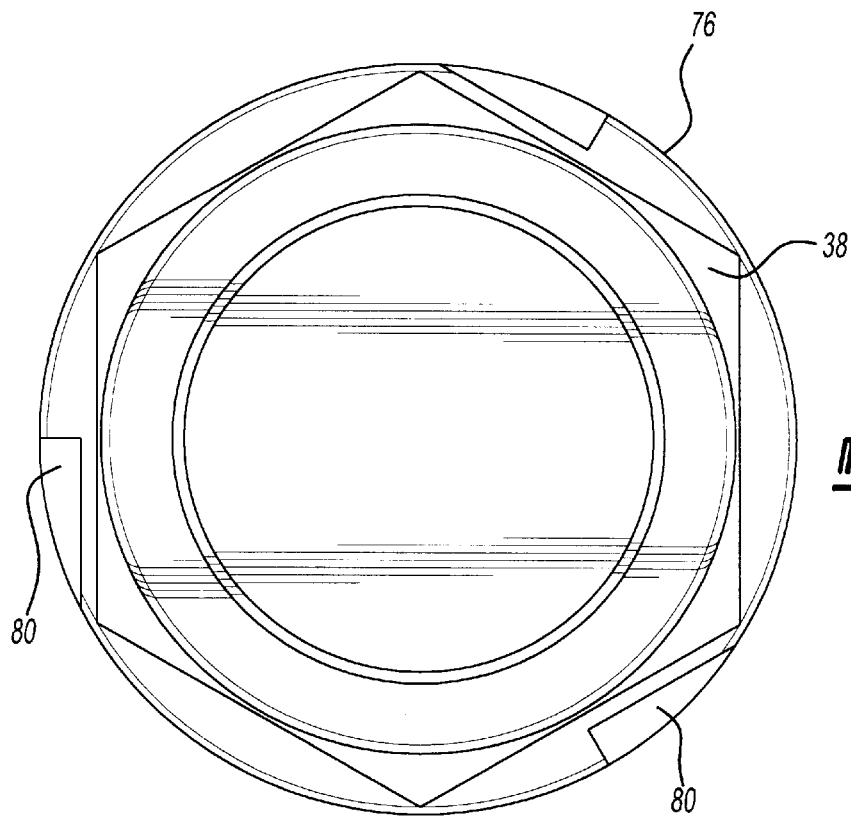
FIG. 10 is an top elevational view of the retaining nut of the present invention.
Figure 11:
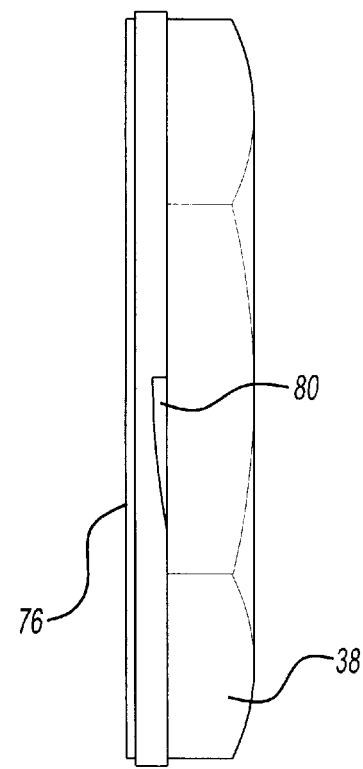
FIG. 11 is a side elevational view of the retaining nut in FIG. 10.

Referring to FIGS. 10 and 11, the end nut 38 has an outer perimeter 76 adjacent to the arcuate flange 74. The end nut 38 has at least one recess 80. A portion 78 of the flange 74 is deformed into engagement with the recess 80 of the end nut 38, preferably so that the portion 78 shears and the portion 78 abuts the recess 80 to ensure that the end nut 38 cannot rotate relative to the washer assembly 42. Preferably, the end nut 38 has three recesses 80 disposed radially about the end nut 38 with the flange 74 deformed into engagement with only one recess 80. By only deforming one portion 78 of the flange 74, the same washer assembly 42 to be used two more times. It can be seen that the retaining assembly of the present invention prevents the end nut 38 from rotating relative to the spindle 24 and loosening from its originally installed location.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An axle assembly for supporting wheels comprising:
   a spindle defining an axis of rotation and having a threaded end portion;
   a hub assembly supported by said spindle and adapted to support the wheels;
   a bearing assembly adjacent to said threaded end portion and interposed between said spindle and said hub assembly for permitting low friction rotation of said hub assembly relative to said spindle about said axis;
   an end nut secured to said threaded end portion of said spindle for retaining said bearing assembly and said hub assembly on said spindle; and
   a washer assembly interposed between said bearing assembly and said end nut wherein said washer assembly comprising locating and staking washers secured to one another cooperating to secure said end nut to said spindle for preventing rotation of said end nut about said axis.

2. The assembly as set forth in claim 1 wherein said locating washer engages said spindle and said staking washer engages said end nut for preventing rotation of said washer assembly and said end nut about said axis.

3. The assembly as set forth in claim 2 wherein said spindle includes a groove generally parallel with said axis, and said locating washer includes a first inner diameter with a tab extending radially inwardly therefrom which engages said groove.

4. An axle assembly for supporting wheels comprising:
   a spindle defining an axis of rotation and having a threaded end portion, said spindle including a groove generally parallel with said axis;
   a hub assembly supported by said spindle and adapted to support the wheels;
   a bearing assembly adjacent to said threaded end portion and interposed between said spindle and said hub assembly for permitting low friction rotation of said hub assembly relative to said spindle about said axis;
   an end nut secured to said threaded end portion of said spindle for retaining said bearing assembly and said hub assembly on said spindle; and
   a washer interposed between said bearing assembly and said end nut wherein said washer secures said end nut to said spindle for preventing rotation of said end nut about said axis, said washer comprising a washer assembly including a locating washer and a staking washer secured to one another, said locating washer engaging said spindle and said staking washer engaging said end nut for preventing rotation of said washer assembly and said end nut about said axis, and said locating washer includes a first inner diameter with a tab extending radially inwardly therefrom which engages said groove, wherein said first inner diameter of said locating washer includes at least one notch, and said staking washer includes a second inner diameter with at least one prong extending transversely therefrom for engaging said at least one notch and securing said locating and staking washers together.

5. The assembly as set forth in claim 4 wherein said end nut includes an outer perimeter, and wherein said staking washer includes an outer diameter with an arcuate flange extending transversely therefrom adjacent to said outer perimeter, a portion of said flange engaging said end nut.

6. The assembly as set forth in claim 5 wherein said end nut has at least one recess, said flange deformed into engagement with said at least one recess.

7. The assembly as set forth in claim 6 wherein said at lease one recess comprises three recess, said flange deformed into engagement with one of said three recesses.

8. A method for retaining a hub assembly and bearing assembly on a spindle of an axle assembly comprising the steps of:
   (a) installing a hub assembly and bearing assembly onto a spindle having an axis;
   (b) installing a washer onto the spindle adjacent to the bearing assembly, wherein the washer is rotationally fixed to the spindle relative to the axis;
   (c) fastening an end nut onto the spindle adjacent to the washer; and
   (d) plastically deforming the washer into engagement with the end nut for rotationally fixing the end nut relative to the spindle.

9. The method as set forth in claim 8 wherein said washer comprises a washer assembly including a locating washer and a staking washer secured to one another, wherein said locating washer engages said spindle and said staking washer engages said end nut for preventing rotation of said washer assembly and said end nut about said axis.

10. The method as set forth in claim 9 wherein said spindle includes a groove generally parallel with said axis, and said locating washer includes a first inner diameter with a tab extending radially inwardly therefrom which engages said groove.

11. A method for retaining a hub assembly and bearing assembly on a spindle of an axle assembly comprising the steps of:
   (a) installing a hub assembly and bearing assembly onto a spindle having an axis and a groove generally parallel with the axis;
   (b) installing a washer assembly which includes a locating washer and a staking washer onto the spindle adjacent to the hearing assembly, wherein the washer assembly is rotationally fixed to the spindle relative to the axis by a tab extending radially inwardly from a first inner diameter of the locating washer which engages the groove, wherein the first inner diameter of the locating washer includes at least one notch, and the staking washer includes a second inner diameter with at least one prong extending transversely therefrom for engaging the at least one notch and securing the locating and staking washers together;

(c) fastening an end nut onto the spindle adjacent to the washer; and (d) deforming the staking washer into engagement with the end nut for rotationally fixing the end nut relative to the spindle.

12. The method as set forth in claim 11 wherein said end nut includes an outer perimeter, and wherein said staking washer includes an outer diameter with an arcuate flange extending transversely therefrom adjacent to said outer perimeter, a portion of said flange engaging said end nut.

13. The method as set forth in claim 12 wherein said end nut has at least one recess, said flange deformed into engagement with said at least one recess.

14. The method as set forth in claim 13 wherein said portion of said flange is sheared when said flange is deformed into engagement with said at least one recess.

15. The method as set forth in claim 14 wherein said at lease one recess comprises three recess, said flange deformed into engagement with one of said three recesses.

16. The assembly as set forth in claim 1 wherein a first inner diameter of said locating washer includes at least one notch, and said staking washer includes a second inner diameter with at least one prong extending transversely therefrom for engaging said at least one notch and securing said locating and staking washers together.

\* \* \* \* \*